US011667586B2

(12) United States Patent
Zhu et al.

(10) Patent No.: US 11,667,586 B2
(45) Date of Patent: Jun. 6, 2023

(54) BIOLOGICAL PREPARATION METHOD FOR PRODUCING AMINO ACID LIQUID FERTILIZER FROM WASTE FEATHERS

(71) Applicants: INSTITUTE OF MICROBIOLOGY, GUANGDONG ACADEMY OF SCIENCES (GUANGDONG DETECTION CENTER OF MICROBIOLOGY), Guangzhou (CN); GUANGDONG BOWOTE BIOTECHNOLOGY CO., LTD., Zhaoqing (CN)

(72) Inventors: Honghui Zhu, Guangzhou (CN); Lian Zhou, Guangzhou (CN); Xiaolin Xie, Guangzhou (CN); Meibiao Chen, Guangzhou (CN); Qing Yao, Guangzhou (CN)

(73) Assignees: INSTITUTE OF MICROBIOLOGY, GUANGDONG ACADEMY OF SCIENCES (GUANGDONG DETECTION CENTER OF MICROBIOLOGY), Guangzhou (CN); GUANGDONG BOWOTE BIOTECHNOLOGY CO., LTD., Zhaoqing (CN)

( * ) Notice: Subject to any disclaimer, the term of this patent is extended or adjusted under 35 U.S.C. 154(b) by 116 days.

(21) Appl. No.: 17/762,751

(22) PCT Filed: Jul. 16, 2019

(86) PCT No.: PCT/CN2019/096125
§ 371 (c)(1),
(2) Date: Mar. 23, 2022

(87) PCT Pub. No.: WO2020/143205
PCT Pub. Date: Jul. 16, 2020

(65) Prior Publication Data
US 2022/0363606 A1 Nov. 17, 2022

(30) Foreign Application Priority Data

Jan. 9, 2019 (CN) .......................... 201910020373.8

(51) Int. Cl.
*C05G 5/20* (2020.01)
*C05F 1/00* (2006.01)

(52) U.S. Cl.
CPC ................ *C05F 1/005* (2013.01); *C05G 5/20* (2020.02)

(58) Field of Classification Search
CPC ............ C05F 1/005; C05F 11/00; C05G 5/20; Y02A 40/20; C05C 11/00
See application file for complete search history.

(56) References Cited

FOREIGN PATENT DOCUMENTS

| CN | 1166526 A | 12/1997 |
| CN | 103483012 A | 1/2014 |

(Continued)

OTHER PUBLICATIONS

Du Yongkai, Preliminary Study of Keratin Degradation Mechanism of Bacillus Amyloliquefaciens, Chinese Academy of Agricultural Sciences Dissertation, 2017, pp. 1-65.

*Primary Examiner* — Jennifer A Smith
(74) *Attorney, Agent, or Firm* — Bayramoglu Law Offices LLC

(57) ABSTRACT

A method for producing an amino acid liquid fertilizer from waste feathers includes: acquiring an enzymatic hydrolysate by performing enzymolysis on feather powder with a complex enzyme; adding acid protease to the enzymatic hydrolysate for enzymolysis; and acquiring the amino acid liquid fertilizer by performing enzyme inactivation on a filtrate acquired by performing filtering after enzymolysis is completed, wherein the complex enzyme includes keratinase and amino acid peptidase. By adopting this method, the enzymolysis rate of the feathers reaches 80% or above and the (Continued)

prepared amino acid liquid fertilizer contains various kinds of amino acids (17 amino acids); and the content of the amino acid can reach 10.12% (by mass fraction) or above and the content of small peptide reaches 9.39% (by mass fraction), which reach the Chinese standard of the amino acid liquid fertilizers without concentration. Thus, the environmental-friendly amino acid liquid fertilizer can be prepared.

11 Claims, 4 Drawing Sheets

(56) References Cited

FOREIGN PATENT DOCUMENTS

| | | |
|---|---|---|
| CN | 104585513 A | 5/2015 |
| CN | 104769128 A | 7/2015 |
| CN | 104798981 A | 7/2015 |
| CN | 105175161 A | 12/2015 |
| CN | 106387320 A | 2/2017 |
| CN | 104798981 B | 8/2018 |
| CN | 109650946 A | 4/2019 |
| JP | H0646871 A | 2/1994 |

BIOLOGICAL PREPARATION METHOD FOR PRODUCING AMINO ACID LIQUID FERTILIZER FROM WASTE FEATHERS

CROSS REFERENCE TO THE RELATED APPLICATIONS

This application is the national phase entry of International Application No. PCT/CN2019/096125, filed on Jul. 16, 2019, which is based upon and claims priority to Chinese Patent Application No. 201910020373.8, filed on Jan. 9, 2019, the entire contents of which are incorporated herein by reference.

TECHNICAL FIELD

The present invention belongs to the field of fertilizer processing technologies, and specifically discloses a method for preparing an amino acid liquid fertilizer by performing complex enzymolysis on waste feathers in steps with keratinase, neutral protease, alkaline protease, amino acid peptidase and acid protease.

BACKGROUND

In the world, millions of tons of feathers are left as waste after poultry treatment every year, but the resource utilization of the feathers is less than 20%. Most of the feathers are treated as waste except a small number of them used as warm clothing fillers and animal feeds, which not only wastes resources, but also causes serious pollution to the environment due to traditional incineration, landfill and other treatment methods. Therefore, the management of feather waste has become an urgent problem to be solved by poultry slaughter enterprises. Actually, the feather waste is a natural protein-rich resource with the content of crude protein up to 85%-90%. In feather protein, the content of lysine and methionine is significantly lower, but the content of amino acid components essential to other animals is slightly higher than that of fish powder, which means that the use of protein hydrolysis to produce amino acid-related products from the feathers has significant potential economic benefits. As the protein in poultry feathers is mainly composed of keratin containing more cystine, between which a large number of disulfide bonds are formed, and together with hydrogen bonds and intermolecular forces, it is difficult to hydrolyze the poultry feathers by common protease (such as alkaline protease, trypsin, pepsin and papain). However, the processing of the waste feathers by high-temperature and high-pressure steaming hydrolysis, a puffing method, acid-base hydrolysis, an oxidant or a reducing agent, and other traditional methods has the defects of high fixed investment, a long capital recovery period, severe reaction conditions, relatively high requirements for production devices, high energy consumption, and high possibility of configuration change or racemization of a product, resulting in the problems of extremely complex components of the product, serious damage to amino acids, a high content of salt in the product, serious environmental pollution and the like. Indeed, these problems can be solved well by using a modern biotechnology. For example, if the feather protein is degraded with keratinase, the energy consumption and environmental pollution can be reduced, the nutritional value of hydrolysates is increased, and an enzymolysis product mainly including small peptide and amino acids is formed, which has a great potential in producing functional small-molecular-peptide feeds and amino acid liquid fertilizers.

The amino acid can regulate and stimulate crop growth and development (promote seed germination and growth and root growth, regulate root morphology, promote leaf growth and increase the content of leaf green, etc.), improve the crop quality, increase the crop yield, and improve disease resistance and stress resistance of crop, and can also promote absorption of other nutrients such as nitrogen, phosphorus and potassium by the crop. Moreover, the amino acid can be used alone as a biostimulant or an amino acid nitrogen fertilizer, or may be used as a bioactive synergist applied in combination with a chemical fertilizer (such as an amino acid liquid fertilizer) to play multiple synergistic effects. Therefore, the amino acid is used more widely in agriculture. Common producing methods for the amino acid at present are that a stock solution of the amino acid is acquired by enzyme or acid hydrolysis of raw protein materials or an amino acid fermentation tail liquid is concentrated. However, all these methods have their own disadvantages. For example, the acid hydrolysis causes great pollution to the environment, and the content of chloride in the stock solution of the amino acid is higher, which has a toxic effect on some chlorine-sensitive plants. For enzyme hydrolysis, the content of the amino acid in an enzymatic hydrolysate is lower due to raw materials of enzymolysis and the enzymolysis process, and thus, it is required to increase the concentration of the stock solution of the amino acid through concentration, resulting in a higher cost. An amino acid tail liquid concentration method also has the problems of higher cost, excessive high concentration of sodium ions in a concentrated product and salt damage sometimes.

SUMMARY

An object of the present invention is, regarding the above problems, to provide a biological preparation method for producing an amino acid liquid fertilizer from waste feathers. In the present invention, the waste feathers are subjected to enzymolysis in steps with a complex enzyme, so that the concentration of an amino acid in an enzymatic hydrolysate of the waste feathers reaches 10% or above, which reaches the Chinese standard of amino acid liquid fertilizers without concentration. Thus, the environmental-friendly amino acid liquid fertilizer is prepared.

The method for producing an amino acid liquid fertilizer from waste feathers according to the present invention includes the followings steps:

acquiring an enzymatic hydrolysate by performing enzymolysis on feather powder with a complex enzyme; adding acid protease to the enzymatic hydrolysate for enzymolysis; and acquiring the amino acid liquid fertilizer by performing enzyme inactivation on a filtrate acquired by performing filtering after enzymolysis is completed, wherein the complex enzyme includes keratinase and amino acid peptidase, and the amino acid peptidase refers to peptidase.

Preferably, the complex enzyme includes the keratinase, neutral protease, alkaline protease and the amino acid peptidase.

Further preferably, the complex enzyme includes, based on an enzyme activity ratio, 34%-66% of keratinase, 5%-56% of alkaline protease, 5%-56% of neutral protease and 5%-56% of amino acid peptidase.

Further preferably, the complex enzyme includes, based on the enzyme activity ratio, 45.6% of keratinase, 11.8% of alkaline protease, 11.6% of neutral protease and 31.0% of amino acid peptidase.

Preferably, the feather powder is acquired by the steps of removing impurities from the waste feathers and washing the waste feathers; air-drying or drying the waste feathers subjected to high-temperature steaming or treated with sodium sulfite; and pulverizing and grinding the waste feathers. The high-temperature steaming or sodium sulfite treatment may facilitate the enzymolysis by the protease. Further preferably, said high-temperature steaming is that the feathers are steamed for 30 min at 135° C. and 0.4 MPa.

Said pulverizing and grinding are that pulverizing and grinding are performed and then sieving is performed with a sieve with a mesh diameter of 1 mm to acquire the feather powder.

Preferably, said enzymolysis with the complex enzyme is that the feather powder is added to water in such a way that the mass fraction of the feather powder is 30% or above, sterilization is performed after the pH is adjusted to 8.5-9.5, and the complex enzyme is added with the enzyme dosage of 9000 units per gram of feather powder or above for enzymolysis at 53-60° C. for 36 h or above.

Preferably, said enzymolysis with the complex enzyme is that the feather powder is added to water in the mass ratio of 3:10, sterilization is performed after the pH is adjusted to 9, the complex enzyme is added with the enzyme dosage of 9000 units per gram of feather powder for enzymolysis at 53° C. for 36 h.

Preferably, said enzymolysis with the acid protease is that the acid protease is added with the dosage of 2000 units per gram of feather powder for enzymolysis at 40° C. for 12.

Preferably, said enzyme inactivation is performed for 10 min at 90° C.

Preferably, the feathers are feathers of various kinds of poultry, such as feathers of chickens, ducks and geese.

Compared with the prior art, the present invention has the following benefits.

By adopting the method according to the present invention, the enzymolysis rate of the feathers can reach 80% or above and the prepared amino acid liquid fertilizer contains various kinds of amino acids (17 amino acids); and the content of the amino acids can reach 10.12% (by mass fraction) or above and the content of small peptide reaches 9.39% (by mass fraction), which reach the Chinese standard of the amino acid liquid fertilizers without concentration. Thus, the environmental-friendly amino acid liquid fertilizer can be prepared. The method according to the present invention can be used for industrial production, is simple and stable in process, can omit a concentration process in a traditional amino acid liquid fertilizer preparation process to greatly reduce the energy consumption and pollution, and has the advantages of wide raw material sources, low cost and various kinds of amino acids contained in the product and the like, and thus is a production technology for the environmental-friendly amino acid liquid fertilizer.

BRIEF DESCRIPTION OF THE DRAWINGS

The present invention is further illustrated below with reference to the accompanying drawings.

DETAILED DESCRIPTION

Figure 1:
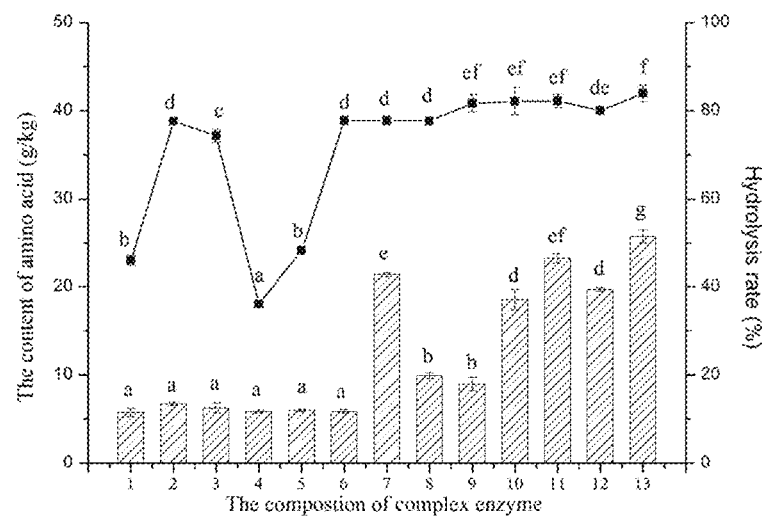
FIG. 1 shows the effect of a composition of different kinds of protease on the enzymolysis rate (broken line) of feathers and the content of an amino acid (histogram)

The following further explains the present invention with reference to the accompanying drawings of the description and specific embodiments, but does not constitute any limitation to the present invention. Unless otherwise specified, conventional reagents and method steps are used in the following embodiments.

Embodiment 1

1.1 Materials and Reagents

Feathers: the feathers were provided by Guangdong Bowote Biotechnology Co., Ltd., belonged to feathers of chickens and were thoroughly washed and dried for later use.

Keratinase (100,000 U/g) was self-produced. Neutral protease (100,000 U/g), alkaline protease (100,000 U/g), lipase (200,000 U/g), and papain (100,000) U/g) were provided by Yangshao Biochemical Technology Co., Ltd. Amino acid peptidase (100,000 U/g, exopeptidase) was provided by Angel Yeast Co., Ltd. Acid protease (50,000 U/g) was provided by Yuanye Biotechnology Co., Ltd. NaOH, HCl, sodium citrate, sulfosalicylic acid, trichloroacetic acid, potassium sulfate, EDTA-Na and other reagents were of analytical grade. A mixed amino acid standard solution was of chromatographically pure grade.

1.2 Instruments and Devices

Laboratory instruments, an automatic amino acid analyzer, a Kjeldahl nitrogen analyzer, a centrifuge and the like were well arranged in coordination.

1.3. Method 1.3.1 Process Flow

Collecting of feathers; washing; steaming for 30 min at 0.4 MPa (pretreatment); drying; pulverizing; sieving with a sieve with a mesh diameter of 1 mm; first enzymolysis; secondary enzymolysis; filtering (with two layers of gauze); performing enzyme inactivation (90° C., 10 min)-cooling; and packaging.

1.3.2 Determination of Free Amino Acid

The free amino acid was determined according to the method for water-soluble fertilizers containing amino acids in the Agricultural Industry Standard (NY/T 1975-2010) with an automatic amino acid analyzer L-8900.

1.3.3 Determination of Content of Peptide

The content of peptide was determined according to the method in the Chinese Standard for Soy Peptide Powder (GB/T 22492-2008).

1.3.4 Determination of Enzymolysis Rate

An enzymatic hydrolysate was filtered through a 300-mesh sieve, and dried at 105° C. to a constant weight to calculate the enzymolysis rate.

The enzymolysis rate of feathers (%)=(the amount of feathers—the dry weight of feather residues)/the amount of feathers*100%.

1.3.5 Determination of Optimal Pretreatment Method for Feathers

Feathers were pretreated through five methods including high-temperature steaming treatment, ultrasonic treatment, microwave treatment and sodium sulfite treatment respectively; the feathers pretreated by each of the five methods were dried and pulverized; and the optimal pretreatment method for the feathers was determined by performing enzymolysis on the dried and pulverized feathers with keratinase.

Specific Treatment Method

Feather powder was acquired after performing impurity removal on collected waste feathers, washing, pretreating, natural air-drying, pulverizing, grinding and sieving with a sieve having the mesh diameter of 1 mm.

The feather powder acquired using high-temperature steaming (feathers were steamed for 30 min at 135° C. and 0.4 MPa) as the pretreatment method was used in the following various experiments.

1.3.6 Selection of Optimal Protease Composition

The total enzyme dosage was fixed to 4500 units per gram of feather powder and various enzymes were added based on an equal enzyme activity ratio. A total of 13 protease compositions were selected to respectively enzymatically hydrolyze the feather powder, referring to table 1 for specific compositions. Enzymolysis was performed under the conditions of the mass concentration of a substrate of 10 g/100 mL (that is, 10 g of feather powder was added to 100 ml of water), the enzyme dosage of 4500 units per gram of the substrate, 45° C., pH of 8.0, and 180 rpm for 3 d. An optimal protease composition for enzymolysis of the feather powder to prepare amino acid-related products was selected by taking the content of a free amino acid as a main evaluation index, and the enzymolysis rate of the feathers as an auxiliary evaluation index. The experiment was repeated, with three samples in each group.

TABLE 1

Table of components of different complex enzyme compositions

| Number | Keratinase | Alkaline protease | Neutral protease | Acid protease | Lipase | Papain | Amino acid peptidase |
|---|---|---|---|---|---|---|---|
| 1 | ✓ | | | | | | |
| 2 | ✓ | ✓ | | | | | |
| 3 | ✓ | | ✓ | | | | |
| 4 | ✓ | | | ✓ | | | |
| 5 | ✓ | | | | ✓ | | |
| 6 | ✓ | | | | | ✓ | |
| 7 | ✓ | | | | | | ✓ |
| 8 | ✓ | ✓ | | | ✓ | | |
| 9 | ✓ | ✓ | | | | ✓ | |
| 10 | ✓ | ✓ | ✓ | | | | |
| 11 | ✓ | ✓ | | | | | ✓ |
| 12 | ✓ | | ✓ | | | | ✓ |
| 13 | ✓ | ✓ | ✓ | | | | ✓ |

1.3.7 Selection of Component Ratio of Complex Enzyme

Based on the selected optimal protease composition, the ratio of four kinds of protease, i.e., keratinase, alkaline protease, neutral protease and amino acid peptidase, was optimized by using the mixture design according to the simplex centroid design principle with software Design-Expert 10. According to the results of the previous experiment, the components and their dosage ranges of the complex enzyme were determined (referring to table 2 for the components and their ranges). Finally, by taking the content of the free amino acid as the main evaluation index, and the enzymolysis rate of the feathers as the auxiliary evaluation index, a verification experiment was performed on the optimized component ratio of the complex enzyme for three times.

TABLE 2

Table of set observed ranges of various components

| Component | Range |
|---|---|
| A = keratinase | $0.34 \leq A \leq 0.85$ |
| B = alkaline protease | $0.05 \leq B \leq 0.56$ |
| C = neutral protease | $0.05 \leq C \leq 0.56$ |
| D = amino acid peptidase | $0.05 \leq D \leq 0.56$ |
| | $A + B + C + D = 1$ |

1.3.8 Single Factor Experiment of Enzymolysis 1.3.8.1 Effect of Complex Protease Dosage on Enzymolysis By using the selected complex protease composition and its component ratio, enzymolysis was performed under the conditions of the mass concentration of the substrate of 10 g/100 mL, the enzymolysis temperature of 45° C. and the pH of an enzymolysis reaction system of 8.0 at 180 rpm for 3 days to observe the effect of the complex enzyme dosage (1500 units per gram of feather powder, 3000 units per gram of feather powder, 4500 units per gram of feather powder, 6000 units per gram of feather powder, 7500 units per gram of feather powder, 9000 units per gram of feather powder, 10500 units per gram of feather powder) on the enzymolysis of the feather powder. The optimal complex protease dosage for enzymolysis of the feather powder to prepare amino acid-related products was selected by taking the content of the free amino acid as the main evaluation index and the enzymolysis rate of the feather powder as the auxiliary evaluation index. The experiment was repeated, with three samples in each group.

1.3.8.2 Effect of System pH on Enzymolysis

By using the selected complex protease composition and its component ratio, enzymolysis was performed under the conditions of the mass concentration of the substrate of 10 g/100 mL, the enzymolysis temperature of 45° C. and the complex enzyme dosage of 4500 units per gram of feather powder at 180 rpm for 3 days to observe the effect of each of the system pHs (6.0, 6.5, 7.0, 7.5, 8.0, 8.5 and 9.0) on the enzymolysis of the feather powder. The optimal complex protease dosage for enzymolysis of the feather powder to prepare amino acid-related products was elected by taking the content of the free amino acid as the main evaluation index and the enzymolysis rate of the feathers as the auxiliary evaluation index. The experiment was repeated, with three samples in each group.

1.3.8.3 Effect of Enzymolysis Temperature on Ezymolysis

By using the selected complex protease composition and its component ratio, enzymolysis was performed under the conditions of the mass concentration of the substrate of 10 g/100 mL, the pH of the enzymolysis reaction system of 8.0 and the complex enzyme dosage of 4500 units per gram of feather powder at 180 rpm for 3 days to observe the effect of each of the enzymolysis temperatures (35° C., 40° C., 45° C., 50° C., 55° C. and 60° C.) on the enzymolysis of the feather powder. The optimal complex protease dosage for enzymolysis of the feather powder to prepare amino acid-related products was selected by taking the content of the free amino acid as the main evaluation index and the enzymolysis rate of the feathers as the auxiliary evaluation index. The experiment was repeated, with three samples in each group.

1.3.8.4 Effect of Concentration of Substrate on Enzymolysis

By using the selected complex protease composition and its component ratio, enzymolysis was performed under the conditions of the enzymolysis temperature of 45° C., the pH of the enzymolysis reaction system of 8.0 and the complex enzyme dosage of 4500 units per gram of feather powder at 180 rpm for 3 days to observe the effect of the concentration of the substrate (5%, 10%, 15%, 20%, 25%, 30% and 35%, the concentration of the substrate refers to the mass of the substrate contained in 100 g of water, and for example, 5% refers to that 100 g of water contains 5 g of the feather powder) on the enzymolysis of the feather powder. The optimal complex protease dosage for enzymolysis of the feather powder to prepare amino acid-related products was screened by taking the content of the free amino acid as the main evaluation index and the enzymolysis rate of the feathers as the auxiliary evaluation index. The experiment was repeated, with three samples in each group.

1.3.8.5 Effect of Enzymolysis Time on Enzymolysis

By using the selected complex protease composition and its component ratio, enzymolysis was performed under the conditions of the mass concentration of the substrate of 10 g/100 mL, the enzymolysis temperature of 45° C., the pH of the enzymolysis reaction system of 8.0 and the complex enzyme dosage of 4500 units per gram of feather powder at 180 rpm to observe the effect of each of the enzymolysis times (12 h, 24 h, 36 h, 48 h, 60 h, 72 h and 84 h) on the enzymolysis of the feather powder. The optimal complex protease dosage for enzymolysis of the feather powder to prepare amino acid-related products was selected by taking the content of the free amino acid as the main evaluation index and the enzymolysis rate of the feathers as the auxiliary evaluation index. The experiment was repeated, with three samples in each group.

Through the above experiments, the optimal single factor level was determined.

1.3.9 Experiment for Optimization of Content of Amino Acid by Response Surface

According to the results of the single factor experiments, by using a response surface design experiment and the Box-Benhnken central combination experiment design principle, a response surface analysis experiment of three levels was performed for four factors which significantly affected the content of the amino acid, i.e., the enzymolysis temperature, the system pH, the concentration of the substrate and the enzyme dosage, Finally, a verification experiment was performed on the optimized enzymolysis conditions for three times.

TABLE 3

Experiment factors and levels optimized by response surface

| | level | | |
|---|---|---|---|
| Factor | −1 | 0 | 1 |
| X1 enzyme dosage | 7500 U/g | 9000 U/g | 10500 U/g |
| X2 enzymolysis temperature | 50° C. | 5° C. | 60° C. |

TABLE 3-continued

Experiment factors and levels optimized by response surface

| | level | | |
|---|---|---|---|
| Factor | −1 | 0 | 1 |
| X3 system pH | 8.0 | 9.0 | 10.0 |
| X4 concentration of a substrate | 20% | 25% | 30% |

1.3.10 Secondary Enzymolysis Experiment by Acid Protease

According to the optimal enzymolysis conditions optimized by the response surface, a preliminary enzymatic hydrolysate was acquired by performing enzymolysis on the feathers with the complex enzyme under such conditions. According to selected optimal enzymolysis conditions of the acid protease, i.e., the conditions of the acid protease dosage of 2000 units per gram of feather, the natural pH (the pH of the preliminary enzymatic hydrolysate was acidic) and the enzymolysis temperature of 40° C. at 180 rpm, enzymolysis was performed for 12 h.

1.4 Results and Analysis 1.4.1 Selection of Pretreatment Method for Feathers

TABLE 4

Effects of different pretreatment methods on enzymolysis rate of feathers and content of amino acid

| Pretreatment method | Pretreatment condition | Content of amino acid (g/kg) | Enzymolysis rate (%) |
|---|---|---|---|
| High-temperature high-pressure steaming | 0.4 MPa, 135° C., 30 min | $5.73 \pm 0.10^{ab}$ | $47.19 \pm 0.93^{ab}$ |
| Sodium sulfite treatment | 0.8 mg/g, 70° C., 20 min | $5.95 \pm 0.08^{a}$ | $48.68 \pm 0.52^{a}$ |
| Ultrasonic treatment | 720 W, 10 min | $5.69 \pm 0.04^{b}$ | $45.65 \pm 0.59^{bc}$ |
| Microwave treatment | 560 W, 100 s | $5.29 \pm 0.07^{c}$ | $44.75 \pm 0.76^{bc}$ |
| Heating treatment | 80° C., 10 min | $5.23 \pm 0.11^{c}$ | $44.41 \pm 1.19^{c}$ |
| Ultra-low temperature treatment | −80° C., 60 min | $4.47 \pm 0.25^{d}$ | $39.53 \pm 0.97^{d}$ |

It can be seen from table 4 that the pretreatment method affected the enzymolysis effect of the feathers. When the feathers were pretreated with sulfurous acid and then subjected to enzymolysis, the enzymolysis rate was highest and the content of the amino acid in the acquired enzymatic hydrolysate of the feathers was also highest. This pretreatment method had no significant difference from high-temperature and high-pressure steaming, but was significantly different from ultrasonic treatment, microwave treatment, heating treatment and ultra-low temperature treatment. Through analysis, the reason for this was that it was difficult to degrade the feathers by common proteases since a large number of disulfide bonds existed in the keratin as protein mainly included in the feathers, but sodium sulfite was a reducing agent conducive to breaking the disulfide bonds in the keratin and thus promotes enzymolysis.

1.4.2 Selection of Complex Enzyme Composition

As the feathers could not be degraded by common protease (for example, the feathers cannot be degraded by amino acid peptidase alone) due to a special structure of keratin of feathers, the complex enzyme composition was based on keratinase. It could be seen from FIG. 1 that in terms of the content of the amino acid in the enzymatic hydrolysate, the complex protease consisting of keratinase, alkaline protease, neutral protease and amino acid peptidase had the best effect, and the keratinase-based complex enzyme, especially a combination of keratinase and amino acid peptidase, was superior to single keratinase. In addition, within a certain range, the more the kinds of protease was, the better the effect was for the reasons that specific enzyme cutting sites of each kind of protease had specificity, after this kind of sites had all been broken, even if the protease was not completely inactivated or protease was supplemented, it was difficult to improve the degree of hydrolysis. This experiment aimed to develop amino acid foliar fertilizers, which belonged to deep enzymolysis. Therefore, in order to further improve the degree of hydrolysis of keratin of the feathers and thus increase the content of the amino acid, the specific enzyme cutting sites of the protease were increased by using multi-enzyme synergistic enzymolysis as different kinds of protease had different specific enzyme cutting sites, which could effectively increase the content of the amino acid. In terms of the enzymolysis rate of the keratin of the feathers, the complex protease consisting of keratinase, alkaline protease, neutral protease and amino acid peptidase had the best effect. Comprehensively considering the enzymolysis rate of the feathers and the content of the amino acid in the enzymatic hydrolysate, the keratinase, alkaline protease, neutral protease and amino acid peptidase were selected for complex enzymolysis of the feathers.

1.4.3 Selection of Component Ratio of Complex Enzyme

For four design factors, an experiment for optimizing the component ratio of complex enzyme by mixture experiment design was performed for 18 times, referring to table 5 for experiment details and results. The experiment results and data were subjected to statistical and regression analysis with Design-Expert 10.0 to acquire a regression equation: the content of the amino acid (g/kg)=1.158A+0.059B+0.059C−6.2249D+49.096AB+49.096AC+69.098AD+37.447BD+37.447CD.

TABLE 5

Table of simplex centroid design experiments and results

| STD | A: keratinase | B: alkaline protease | C: neutral proteinase | D: amino acid peptidase | Content of amino acid (g/kg) |
|---|---|---|---|---|---|
| 1 | 0.595 | 0.05 | 0.05 | 0.305 | 15.3245 |
| 2 | 0.40375 | 0.36875 | 0.11375 | 0.11375 | 14.7125 |
| 3 | 0.34 | 0.05 | 0.305 | 0.305 | 15.5413 |
| 4 | 0.34 | 0.05 | 0.56 | 0.05 | 12.341 |
| 5 | 0.40375 | 0.11375 | 0.11375 | 0.36875 | 16.2971 |
| 6 | 0.85 | 0.05 | 0.05 | 0.05 | 8.006 |
| 7 | 0.34 | 0.305 | 0.305 | 0.05 | 13.6415 |
| 8 | 0.4675 | 0.1775 | 0.1775 | 0.1775 | 15.7835 |
| 9 | 0.34 | 0.05 | 0.05 | 0.56 | 13.84 |
| 10 | 0.40375 | 0.11375 | 0.36875 | 0.11375 | 14.7125 |
| 11 | 0.34 | 0.56 | 0.05 | 0.05 | 12.341 |
| 12 | 0.85 | 0.05 | 0.05 | 0.05 | 8.006 |
| 13 | 0.34 | 0.56 | 0.05 | 0.05 | 12.341 |
| 14 | 0.595 | 0.05 | 0.305 | 0.05 | 13.4248 |
| 15 | 0.34 | 0.05 | 0.56 | 0.05 | 12.341 |
| 16 | 0.65875 | 0.11375 | 0.11375 | 0.11375 | 13.5204 |
| 17 | 0.595 | 0.305 | 0.05 | 0.05 | 13.4248 |
| 18 | 0.34 | 0.305 | 0.05 | 0.305 | 15.5413 |

TABLE 6

Table of analysis of variance for regression model of content of amino acid

| Source | Sum of Squares | df | Mean Square | F Value | p-value Prob > F | |
|---|---|---|---|---|---|---|
| Model | 91.86 | 8 | 11.48 | 70.12 | <0.0001 | significant |
| [1]Linear Mixture | 48.87 | 3 | 16.29 | 99.49 | <0.0001 | |
| AB | 9.24 | 1 | 9.24 | 56.40 | <0.0001 | |
| AC | 9.24 | 1 | 9.24 | 56.40 | <0.0001 | |
| AD | 16.67 | 1 | 16.67 | 101.82 | <0.0001 | |
| BD | 4.86 | 1 | 4.86 | 29.69 | 0.0004 | |
| CD | 4.86 | 1 | 4.86 | 29.69 | 0.0004 | |
| Residual | 1.47 | 9 | 0.16 | | | |
| Lack of Fit | 1.47 | 6 | 0.25 | | | |
| Pure Error | 0.000 | 3 | 0.000 | | | |
| R-Squared | | | | | 0.9842 | |
| Adj R-Squared | | | | | 0.9702 | |

It could be seen from table 6 that P<0.0001 in this model indicated that this regression model reached the extremely significance level; the correlation coefficient $R^2$=0.9058 indicated that this regression equation had a better regression effect, this model could explain 98.42% of total variance, except 1.58% of the total variance. The larger coefficient of determination of the model showed the better goodness of fit between a predicted value and a measured value of the model while this coefficient must be greater than 0.80. Adj.$R^2$=0.9702 in this model indicated that the model was significant. By comparing the absolute values of the coefficients of the first-order terms of the equation, the primary and secondary effects of the various factors on the response value could be determined. It could be seen from the equation that the degrees of contribution of various component enzymes to the content of the amino acid were as follows: D (amino peptidase)>A (keratinase)>B (alkaline protease)=C (neutral protease). It could be seen from table 6 that the interaction of AB, AC, AD, BD and CD was extremely significant, which indicated that their combination may significantly affect the content of the amino acid.

Figure 2:
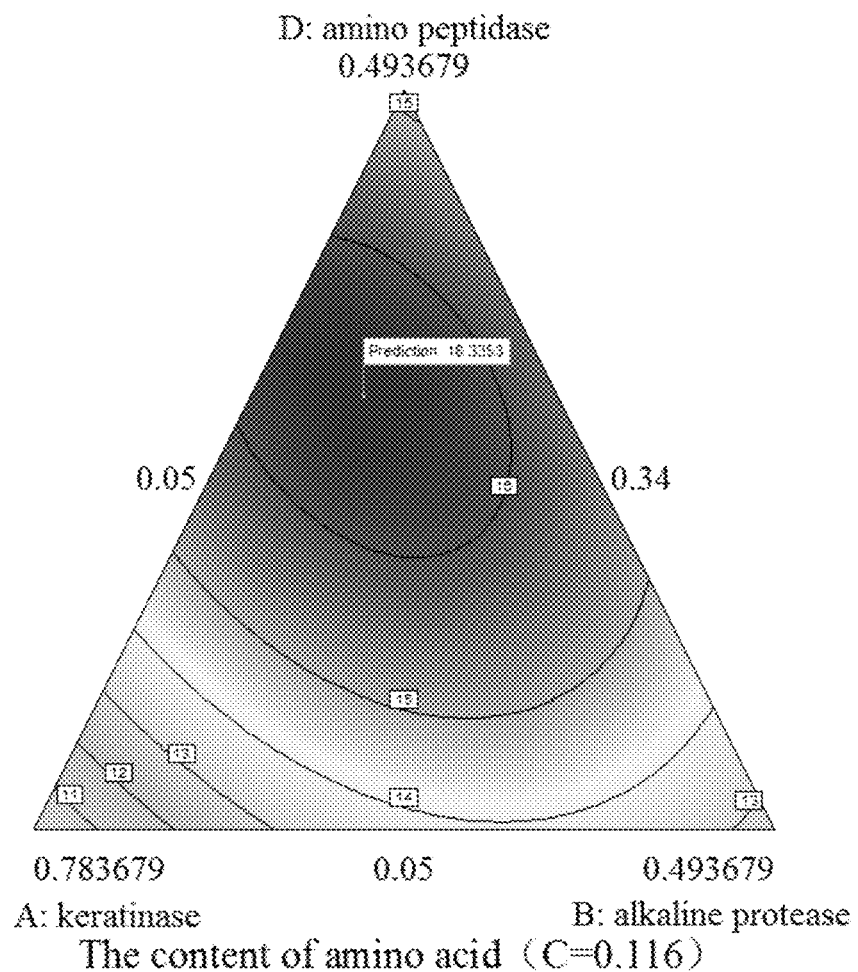
FIG. 2 is a contour plot showing the effect of the interaction of various kinds of protease on the content of the amino acid.

According to target ranges of the evaluation indexes and component ratio ranges, 12 formulas that meet requirements and predicted valued of corresponding indexes were optimized. For convenience of an actual operation, the component ratio of the complex enzyme selected (according to the enzyme activity ratio) herein was as follows: 45.6% of keratinase, 11.8% of alkaline protease, 11.6% of neutral protease, and 31.0% of amino acid peptidase. The content of the amino acid predicted under this condition reached 16.34 g/kg, as shown in FIG. 2. In order to verify the reliability of model prediction, a verification experiment was performed for three times under the optimal component ratio of the complex enzyme (specifically, enzymolysis was performed for 3 d under the conditions of the mass concentration of the substrate of 10 g/100 mL (that is, 10 g of feather powder was added to 100 ml of water), the dosage of the complex enzyme of 4500 units per gram of the substrate, and the component proportions of the complex enzyme (according to the enzyme activity ratio) of 45.6% of keratinase, 11.8% of alkaline protease, 11.6% of neutral protease, and 31.0% of amino acid peptidase at 45° C., pH 8.0 and 180 rpm), and the measured content of amino acid was 16.54 g/kg, which was basically close to the predicted value, with a difference of 1.25%.

1.4.4 Single Factor Experiment

1.4.4.1 Effect of Complex Protease Dosage on Enzymolysis

Figure 3:
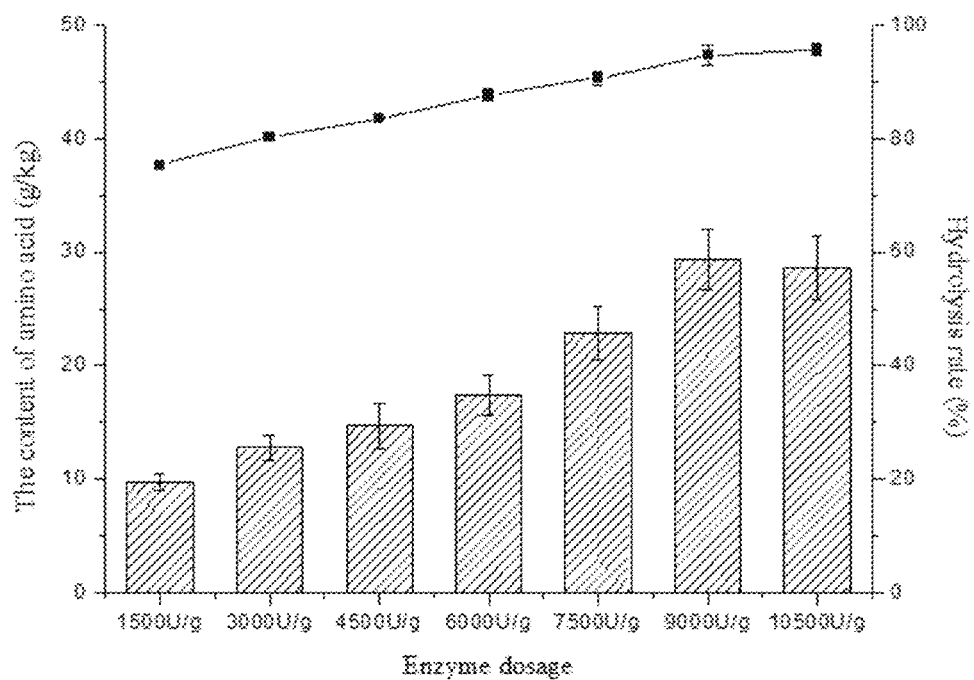
FIG. 3 shows the effect of different dosages of a complex enzyme on the enzymolysis rate (broken line) of feathers and the content of the amino acid (histogram)

It could be seen from FIG. 3 that in terms of the content of the amino acid, the content of the amino acid in the enzymatic hydrolysate gradually increased with an increase of the complex enzyme dosage, and when the complex enzyme dosage reached 9000 units per gram of feather powder, the content of the amino acid reached the maximum value of 29.30 g/kg. As the complex enzyme dosage increased continuously, the content of the amino acid decreased slightly. In terms of the enzymolysis rate of the feathers, the enzymolysis rate of the feathers gradually increased with the increase of the complex enzyme dosage. When the complex enzyme dosage exceeded 9000 units per gram of feather powder, the increase rate of the enzymolysis rate of the feathers was decreased for the reason that the protease first reacted with the substrate to form an enzyme-substrate compound. When the concentration of the substrate was much larger than the concentration of the enzyme, the concentration of the enzyme was proportional to the reaction rate of the enzyme. If the concentration of the enzyme was increased at this time, the reaction rate may be increased. Therefore, within certain reaction time, the higher the enzymolysis efficiency of protein was, the higher the amino acid conversion rate and the protein enzymolysis rate were. However, the larger dosage of the enzyme could cause hydrolysis of various kinds of protease, resulting in a decrease in enzyme activity and higher production cost. Therefore, comprehensively considering the enzymolysis rate of feathers, the content of the amino acid and the production cost, it was determined that the optimal complex enzyme dosage was 9000 units per gram of feather powder.

1.4.4.2 Effect of System pH on Enzymolysis

Figure 4:
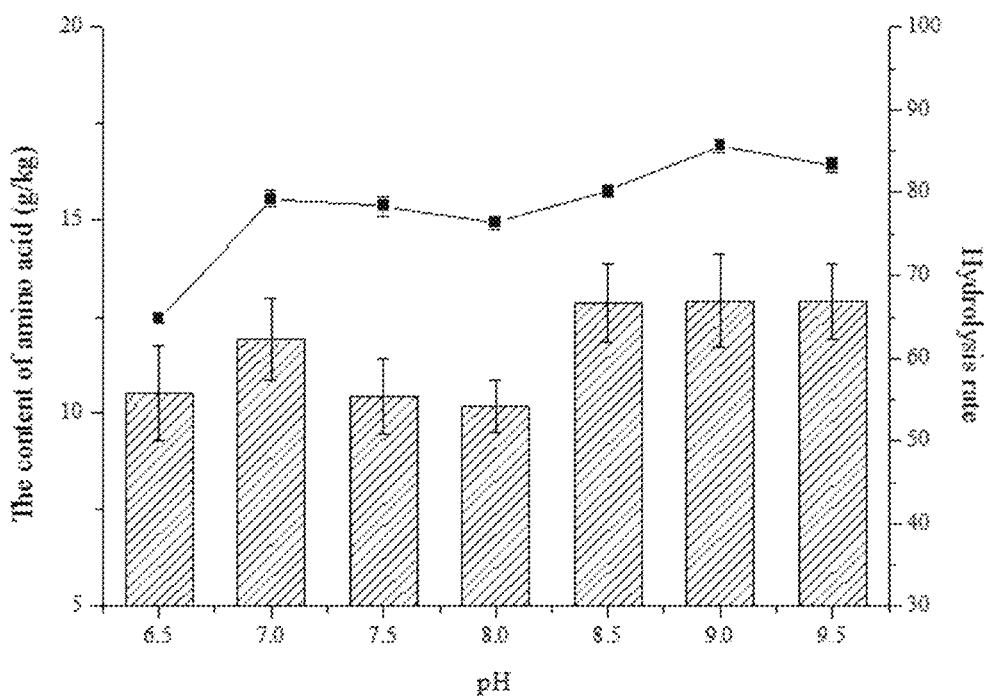
FIG. 4 shows the effect of the system pH on the enzymolysis rate (broken line) of the feathers and the content of the amino acid (histogram)

It could be seen from FIG. 4 that in terms of the content of the amino acid, the content of the amino acid in the enzymatic hydrolysate, within the range of pH 6.5-7.0, increased with an increase of pH and reached 11.91 g/kg at pH 7.0; and, within the range of pH 7.0-9.0, decreased firstly and then increased, reached the maximum value of 12.92 g/kg at pH 9.0, and slightly decreased when the pH increased again. In addition, the enzymolysis rate of the feathers showed a similar trend, and reached the maximum value of 85.65% at pH 9.0. Through the analysis, the reason was as follows. When the pH of the reaction system was high or low, the charged state of the activity of the protease was partially changed, and the binding ability of the protease to the substrate was lowered, and thus, the enzyme activity. Each enzyme had a specific optimal pH and the complex enzyme contained the neutral protease. At pH 7.0, the neutral protease in the complex enzyme exhibited a higher enzyme activity, which could be one of the reasons why the complex enzyme had a small peak at pH 7.0. Therefore, comprehensively considering the enzymolysis rate of the feathers of the content of the amino acid, it was determined that the optimal enzymolysis system pH of the complex enzyme was 9.0.

1.4.4.3 Effect of Enzymolysis Temperature on Enzymolysis

Figure 5:
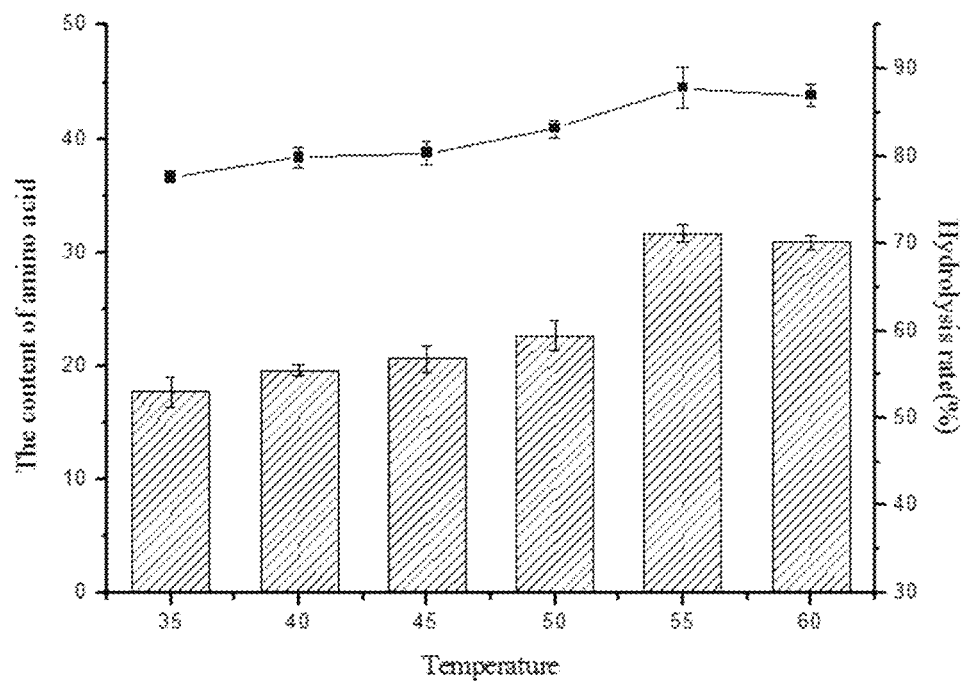
FIG. 5 shows the effect of the enzymolysis temperature on the enzymolysis rate (broken line) of the feathers and the content of the amino acid (histogram)

It can be seen from FIG. 5 that with a rise of the enzymolysis temperature, the enzymolysis rate of the feathers and the content of the amino acid in the enzymatic hydrolysate increased first and then decreased and the enzymolysis rate (87.86%) of the feathers by the complex enzyme and the content of the amino acid (31.66 g/kg) in the enzymatic hydrolysate reached the maximum at 55° C. This was because the protease as a protein biocatalyst was greatly affected by temperature. Within a certain temperature range, the catalytic reaction rate increased with the rise of temperature, but too high temperature would cause denaturing of the enzyme, reducing the catalytic activity. Therefore, comprehensively considering the enzymolysis rate of the feathers and the content of the amino acid, it was determined that the optimal enzymolysis temperature of the complex enzyme was 55° C.

1.4.4.4 Effect of Concentration of Substrate on Enzymolysis

Figure 6:
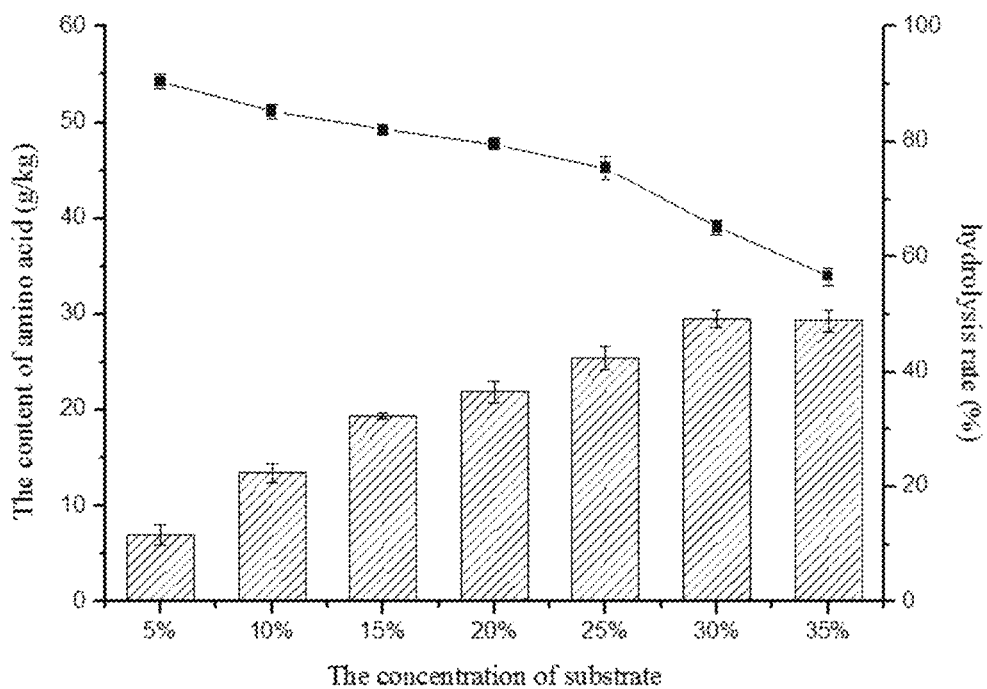
FIG. 6 shows the effect of the concentration of a substrate on the enzymolysis rate (broken line) of the feathers and the content of the amino acid (histogram)

It could be seen from FIG. 6 that in terms of the content of the amino acid in the enzymatic hydrolysate, the content of the amino acid first increased and then decreased with an increase of the concentration of the substrate, and was highest, reaching 29.58 g/kg, when the concentration of the substrate was 30 g/100 mL. The content of the amino acid decreased slightly when the concentration of the substrate increased continuously, which probably arose from a cause as follows: the reduction of the effective water concentration of the enzymolysis system due to excessively high concentration of the substrate reduced the diffusion and movement of molecules, and thus, hydrolysis reaction is inhibited; and in addition, an inactive intermediate product probably formed by the protein substrate of the excessively high concentration with the protease inhibited the hydrolysis reaction, and thus, the content of the amino acid in the enzymatic hydrolysate was reduced. In terms of the enzymolysis rate of the feathers, the enzymolysis rate of the feathers was continuously decreased with the increase of the concentration of the substrate, and when the concentration of the substrate exceeded 25 g/100 mL, the decrease rate of the enzymolysis rate of the feathers was increased significantly. The enzymolysis rate of the feathers was highest, reaching 90.45%, when the concentration of the substrate was 5 g/100 mL. Considering the purpose of the experiment was to develop amino acid foliar fertilizers and that the excessively low concentration of amino acid was an important factor limiting the enzymolysis process, it was therefore determined that the optimal concentration of the substrate for the complex enzymolysis was 30 g/100 mL.

1.4.4.5 Effect of Enzymolysis Time on Enzymolysis

Figure 7:
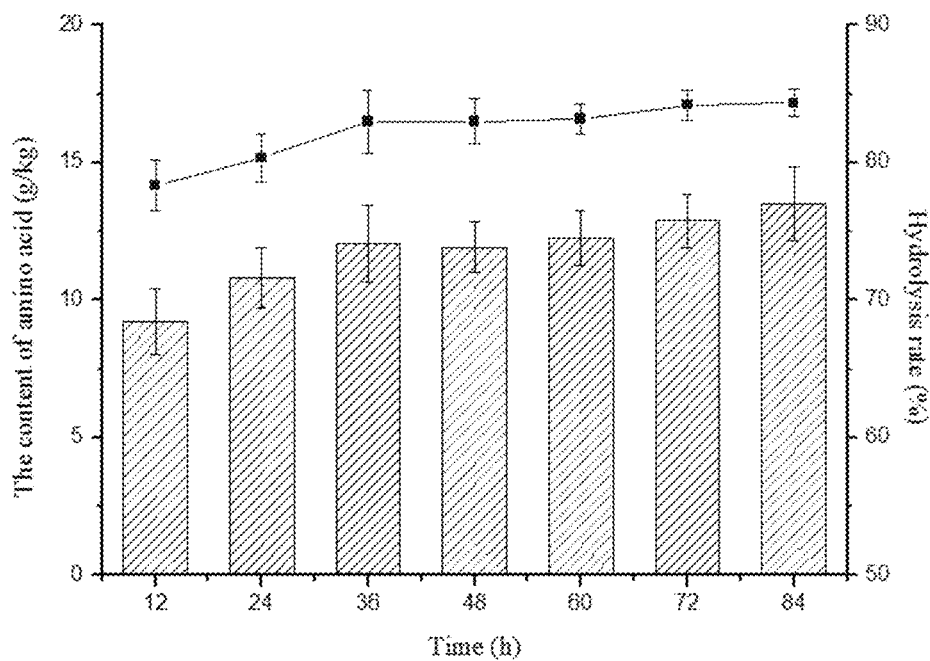
FIG. 7 shows the effect of the enzymolysis time on the enzymolysis rate (broken line) of the feathers and the content of the amino acid (histogram)

It could be seen from FIG. 7 that the enzymolysis rate and the content of the amino acid increased with an increase of enzymolysis time; within 0-36 h, increased rapidly and were 82.98% and 12.06 g/kg respectively when the enzymolysis time was 36 h; and were slowly increased when the enzymolysis time exceeded 36 h. Through analysis, the reason for this was as follows. With the increase of the enzymolysis time, on one hand, the concentration of functional effective peptide bonds was decreased, resulting in weakening of hydrolysis of keratin and decrease in the degree of hydrolysis. On the other hand, peptide molecules in an enzymolysis product competed for a substrate of protease, which decreased the enzymolysis rate. In addition, as the enzymolysis progressed, the system pH decreased and the protease activity decreased, and thus, the enzymolysis rate was reduced. Therefore, comprehensively considering the required production cost of the enzymolysis time, the enzymolysis rate of the feathers, and the content of the amino acid, it was determined that the optimal time for complex enzymolysis was 36 h.

1.4.5 Optimization by Response Surface

TABLE 7

Response surface analysis solution and experiment results

| STD | Enzyme Dosage (U/g) | Temperature (° C.) | System pH | Concentration of substrate (%) | Content of amino acid (g/kg) |
|---|---|---|---|---|---|
| 1 | 10500 | 55 | 9 | 30 | 64.64095 |
| 2 | 10500 | 55 | 9 | 20 | 52.96051 |
| 3 | 9000 | 55 | 8 | 30 | 48.36639 |
| 4 | 10500 | 55 | 10 | 25 | 60.69764 |
| 5 | 9000 | 55 | 8 | 20 | 49.80831 |
| 6 | 7500 | 55 | 8 | 25 | 49.84413 |
| 7 | 9000 | 60 | 9 | 20 | 53.50876 |
| 8 | 9000 | 55 | 9 | 25 | 47.66267 |
| 9 | 10500 | 55 | 8 | 25 | 53.23141 |
| 10 | 9000 | 55 | 9 | 25 | 56.75219 |
| 11 | 9000 | 60 | 9 | 30 | 55.14128 |
| 12 | 7500 | 55 | 10 | 25 | 49.28439 |
| 13 | 9000 | 50 | 9 | 20 | 64.34245 |
| 14 | 9000 | 50 | 8 | 25 | 62.74999 |
| 15 | 9000 | 60 | 8 | 25 | 58.47441 |
| 16 | 9000 | 55 | 10 | 20 | 50.02822 |
| 17 | 9000 | 50 | 10 | 25 | 56.11389 |
| 18 | 7500 | 60 | 9 | 25 | 53.87126 |
| 19 | 9000 | 55 | 10 | 30 | 63.05241 |
| 20 | 9000 | 55 | 9 | 25 | 57.67852 |
| 21 | 9000 | 60 | 10 | 25 | 62.25144 |
| 22 | 10500 | 60 | 9 | 25 | 56.63726 |
| 23 | 9000 | 50 | 9 | 30 | 60.21313 |
| 24 | 7500 | 50 | 9 | 25 | 60.02461 |
| 25 | 7500 | 55 | 9 | 30 | 57.27109 |
| 26 | 7500 | 55 | 9 | 20 | 59.74597 |
| 27 | 10500 | 50 | 9 | 25 | 60.50525 |

TABLE 8

Table for analysis of variance for regression model of content of amino acid

| Source | Sum of Squares | df | Mean Square | F Value | p-value Prob > F | |
|---|---|---|---|---|---|---|
| Model | 622.78 | 13 | 47.91 | 9.61 | 0.0001 | significant |
| A-dosage of enzyme | 70.07 | 1 | 70.07 | 14.06 | 0.0024 | |
| B-temperature | 95.03 | 1 | 95.03 | 19.07 | 0.0008 | |
| C-system pH | 0.21 | 1 | 0.21 | 0.042 | 0.8417 | |
| D-concentration of substrate | 118.39 | 1 | 118.39 | 23.76 | 0.0003 | |
| AB | 4.56 | 1 | 4.56 | 0.92 | 0.3562 | |
| AC | 20.86 | 1 | 20.86 | 4.19 | 0.0615 | |
| AD | 9.89 | 1 | 9.89 | 1.99 | 0.1823 | |
| BC | 9.31 | 1 | 9.31 | 1.87 | 0.1949 | |
| BD | 4.78 | 1 | 4.78 | 0.96 | 0.3454 | |
| A2 | 26.09 | 1 | 26.09 | 5.24 | 0.0395 | |
| B2 | 41.57 | 1 | 41.57 | 8.34 | 0.0127 | |
| C2 | 184.75 | 1 | 184.75 | 37.07 | <0.0001 | |
| D2 | 196.25 | 1 | 196.25 | 39.38 | <0.0001 | |
| Residual | 64.78 | 13 | 4.98 | | | |
| Lack of Fit | 63.35 | 11 | 5.76 | 8.08 | 0.1152 | not significant |
| Pure Error | 1.43 | 2 | 0.71 | | | |
| Cor Total | 687.56 | 26 | | | | |
| R-Squared | | | | | 0.9058 | |
| Adj R-Squa | | | | | 0.8116 | |

The resulting data was subjected to regression analysis with software Design Expert 10.0 to acquire a regression equation:

the content of the amino acid (g/kg)=64.01+2.41$A$−2.81$B$−0.13$C$+3.14$D$+1.07$AB$−2.28$AC$−1.57$AD$−1.53$BC$+1.09$BD$−2.21$A^2$−2.79$B^2$−5.89$C^2$−6.07$D^2$.

Figure 8:
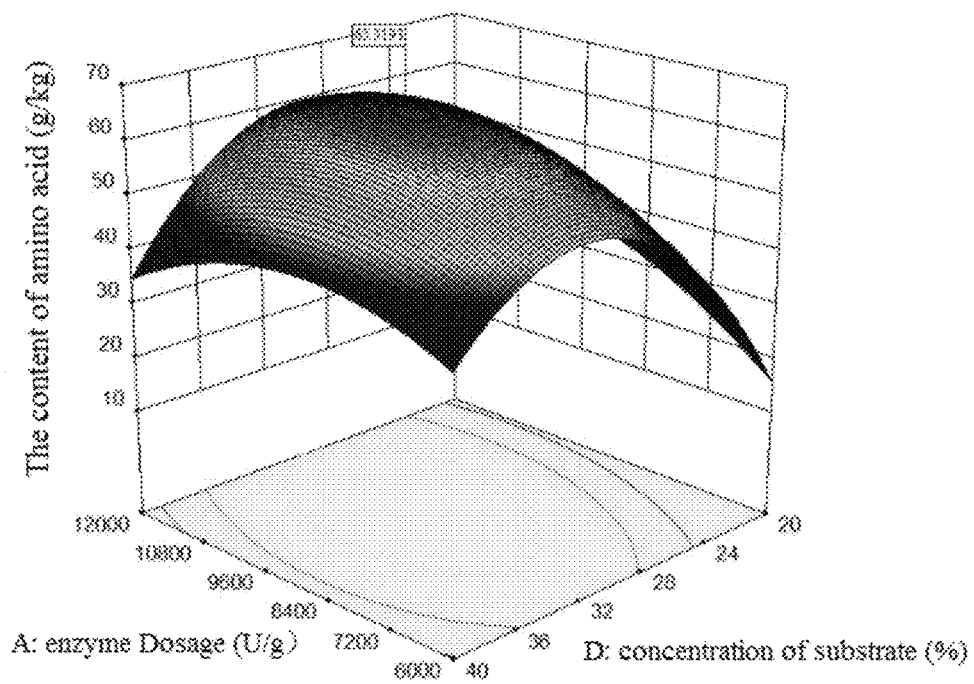
FIG. 8 is a surface plot showing the effect of the interaction of different enzymolysis conditions on the content of the amino acid.

A surface plot acquired by using the software Design Expert 10.0 was as shown in FIG. 8.

It could be seen from Table 8 that P=0.0001 in this model indicated that this regression model reached the extremely significance level; the correlation coefficient $R^2$=0.9058 indicated that this regression equation had a better regression effect and an experimental error was small. Under the condition of the enzymolysis time of 36 h, the optimal conditions for enzymolysis of the feathers by the complex enzyme, which were acquired by response surface analysis, were as follows: the dosage of the complex enzyme was 9623 units per gram of feather powder, the enzymolysis temperature was 53° C., the system pH was 8.96, and the concentration of the substrate of the feathers was 30.85%. The content of the amino acid predicted under such conditions reached 65.319 g/kg. In order to verify the reliability of model prediction, the optimal enzymolysis conditions were slightly modified as follows according to convenience in an actual operation: the dosage of the complex enzyme (including 45.6% of keratinase, 11.8% of alkaline protease, 11.6% of neutral protease, and 31.0% of amino acid peptidase in an enzyme activity ratio) was 9600 units per gram of feather powder, the enzymolysis temperature was 53° C., the system pH was 9.0, the concentration of the substrate of the feathers was 30% (that is, 100 ml of water contains 30 g of feather powder) and the enzymolysis time is 36 h, a verification experiment was performed for three times under such conditions, and the measured content of the amino acid in the enzymatic hydrolysate reached 66.35 g/kg.

1.4.6 Secondary Enzymolysis Experiment and Analysis of Components in Enzymatic Hydrolysate The enzymatic hydrolysate (in which the content of the amino acid was 66.35 g/kg) acquired in section 1.4.5 was further subjected to enzymolysis with acid protease, and the results were as shown in table 9 and table 10. It could be seen from table 9 and table 10 that through further enzymolysis with the acid protease, the kinds of amino acids in the enzymatic hydrolysate were not changed, that is, 17 amino acids were detected well, and the content of the free amino acids released after further enzymolysis increased, reaching 101.23 g/kg, which reached the relevant technical indicators of water-soluble fertilizer liquid products containing amino acids in China. The content of small peptide was 93.94 g/kg, and the enzymolysis rate of the feathers was 80.19%.

TABLE 9

Table of analysis for components of enzymatic hydrolysate acquired by acid proteinase

| Item | Content of amino acid (g/kg) | Content of small peptide (g/kg) | Enzymolysis rate of feathers (%) |
|---|---|---|---|
| Enzymatic hydrolysate | 101.23 | 93.94 | 80.19 |

TABLE 10

Table of analysis for components of amino acids in enzymatic hydrolysate acquired by acid proteinase

| Item | Content of amino acid (g/kg) | Item | Content of amino acid (g/kg) |
|---|---|---|---|
| Asp | 0.5066 | Met | 1.0056 |
| Thr | 5.8624 | Ile | 10.4876 |
| Ser | 11.9700 | Leu | 12.9108 |
| Glu | 4.3412 | Tyr | 3.3815 |

TABLE 10-continued

Table of analysis for components of amino acids in
enzymatic hydrolysate acquired by acid proteinase

| Item | Content of amino acid (g/kg) | Item | Content of amino acid (g/kg) |
|---|---|---|---|
| Gly | 3.1429 | Phe | 7.2728 |
| Pro | 2.4905 | Lys | 2.1783 |
| Ala | 6.1801 | His | 1.0954 |
| Cys | 3.6308 | Arg | 10.9360 |
| Val | 13.8376 | Total content of amino acid | 101.2300 |

In summary, this method for enzymolysis by the complex enzyme in steps can be widely applicable to a process for producing amino acid liquid fertilizers from waste feathers.

What is claimed is:

1. A method for producing an amino acid liquid fertilizer from waste feathers, comprising the following steps:
acquiring an enzymatic hydrolysate by performing a first enzymolysis on a feather powder with a complex enzyme; adding an acid protease to the enzymatic hydrolysate for a second enzymolysis; and acquiring the amino acid liquid fertilizer by performing an enzyme inactivation on a filtrate acquired by performing filtering after the second enzymolysis is completed,
wherein the complex enzyme comprises, based on an enzyme activity ratio, 45.6% of a keratinase, 11.8% of an alkaline protease, 11.6% of a neutral protease, and 31.0% of an amino acid peptidase.

2. The method according to claim 1, wherein the feather powder is acquired by steps of removing impurities from the waste feathers and washing the waste feathers; air-drying or drying the waste feathers subjected to high-temperature steaming or treated with sodium sulfite; and pulverizing and grinding the waste feathers.

3. The method according to claim 2, wherein the high-temperature steaming is that the waste feathers are steamed for 30 min at 135° C. and 0.4 MPa.

4. The method according to claim 1, wherein the waste feathers are feathers of chickens, ducks and/or geese.

5. The method according to claim 1, wherein the first enzymolysis with the complex enzyme is that the feather powder is added to water to allow a concentration of the feather powder to be 30 g/100 g or above, a sterilization is performed after a pH is adjusted to 8.5-9.5, and the complex enzyme is added with an enzyme dosage of 9000 units per gram of the feather powder or above for the first enzymolysis at 53-60° C. for 36 h or above.

6. The method according to claim 1, wherein the second enzymolysis with the acid protease is that the acid protease is added with a dosage of 2000 units per gram of the feather powder for the second enzymolysis at 40° C. for 12; and the enzyme inactivation is performed for 10 min at 90° C.

7. A method for producing an amino acid liquid fertilizer from waste feathers, comprising the following steps:
acquiring an enzymatic hydrolysate by performing a first enzymolysis on a feather powder with a complex enzyme; adding an acid protease to the enzymatic hydrolysate for a second enzymolysis; and acquiring the amino acid liquid fertilizer by performing an enzyme inactivation on a filtrate acquired by performing filtering after the second enzymolysis is completed,
wherein the complex enzyme comprises, based on an enzyme activity ratio, 34%-66% of a keratinase, 5%-56% of an alkaline protease, 5%-56% of a neutral protease, and 5%-56% of an amino acid peptidase,
wherein the first enzymolysis with the complex enzyme is that the feather powder is added to water to allow a concentration of the feather powder to be 30 g/100 g or above, a sterilization is performed after a pH is adjusted to 8.5-9.5, and the complex enzyme is added with an enzyme dosage of 9000 units per gram of the feather powder or above for the first enzymolysis at 53-60° C. for 36 h or above.

8. The method according to claim 7, wherein the first enzymolysis with the complex enzyme is that the feather powder is added to the water in a mass ratio of 3:10, the sterilization is performed after the pH is adjusted to 9, the complex enzyme is added with the enzyme dosage of 9000 units per gram of the feather powder for the first enzymolysis at 53° C. for 36 h.

9. The method according to claim 7, wherein the waste feathers are feathers of chickens, ducks and/or geese.

10. A method for producing an amino acid liquid fertilizer from waste feathers, comprising the following steps:
acquiring an enzymatic hydrolysate by performing a first enzymolysis on a feather powder with a complex enzyme; adding an acid protease to the enzymatic hydrolysate for a second enzymolysis; and acquiring the amino acid liquid fertilizer by performing an enzyme inactivation on a filtrate acquired by performing filtering after the second enzymolysis is completed,
wherein the complex enzyme comprises, based on an enzyme activity ratio, 34%-66% of a keratinase, 5%-56% of an alkaline protease, 5%-56% of a neutral protease, and 5%-56% of an amino acid peptidase,
wherein the second enzymolysis with the acid protease is that the acid protease is added with a dosage of 2000 units per gram of the feather powder for the second enzymolysis at 40° C. for 12; and the enzyme inactivation is performed for 10 min at 90° C.

11. The method according to claim 10, wherein the waste feathers are feathers of chickens, ducks and/or geese.

* * * * *